United States Patent
Radhakrishnan et al.

(10) Patent No.: US 8,621,184 B1
(45) Date of Patent: Dec. 31, 2013

(54) EFFECTIVE SCHEDULING OF PRODUCER-CONSUMER PROCESSES IN A MULTI-PROCESSOR SYSTEM

(75) Inventors: Prashanth Radhakrishnan, Bangalore (IN); Kiran Srinivasan, Cupertino, CA (US)

(73) Assignee: NetApp, Inc., Sunnyvale, CA (US)

( * ) Notice: Subject to any disclaimer, the term of this patent is extended or adjusted under 35 U.S.C. 154(b) by 577 days.

(21) Appl. No.: 12/262,338

(22) Filed: Oct. 31, 2008

(51) Int. Cl.
*G06F 7/38* (2006.01)

(52) U.S. Cl.
USPC ............................................ 712/220

(58) Field of Classification Search
None
See application file for complete search history.

(56) References Cited

U.S. PATENT DOCUMENTS

| | | | | |
|---|---|---|---|---|
| 5,386,524 | A * | 1/1995 | Lary et al. | 711/206 |
| 6,598,086 | B1 * | 7/2003 | Bell et al. | 709/233 |
| 7,246,203 | B2 * | 7/2007 | Moat et al. | 711/133 |
| 2007/0079079 | A1 * | 4/2007 | Li et al. | 711/152 |
| 2007/0156963 | A1 * | 7/2007 | Chen et al. | 711/130 |
| 2008/0005357 | A1 * | 1/2008 | Malkhi et al. | 709/248 |
| 2008/0104325 | A1 * | 5/2008 | Narad et al. | 711/122 |
| 2010/0070730 | A1 * | 3/2010 | Pop et al. | 711/167 |

OTHER PUBLICATIONS

Salehi et al., "The performance impact of scheduling for cache affinity in parallel network processing", Issue Date: Aug. 2-4, 1995, pp. 66-77.*

Zhang et al., "VCluster: a thread-based Java middleware for SMP and heterogeneous clusters with thread migration support", Nov. 21, 2007, Wiley InterScience.*

Abdel-Shafi, Hazim, et al., "An Evaluation of Fine-Grain Producer-Initiated Communication in Cache-Coherent Multiprocessors", IEEE Proceedings of the Third International Symposium on High Performance Computer Architecture, Feb. 1997, San Antonio, TX, 8 pages.

U.S. Patent Application for Multiple-Processor Core Optimization for Producer-Consumer Communication, filed Oct. 31, 2008, by Kiran Srinivasan, et al., 48 pages.

* cited by examiner

*Primary Examiner* — Andrew Caldwell
*Assistant Examiner* — John Lindlof
(74) *Attorney, Agent, or Firm* — Cesari and McKenna, LLP (57) ABSTRACT

A novel technique for improving throughput in a multi-core system in which data is processed according to a producer-consumer relationship by eliminating latencies caused by compulsory cache misses. The producer and consumer entities run as multiple slices of execution. Each such slice has an associated execution context that comprises of the code and data that particular slice would access. The execution contexts of the producer and consumer slices are small enough to fit in the processor caches simultaneously. When a producer entity scheduled on a first core completed production of data elements as constrained by the size of cache memories, a consumer entity is scheduled on that same core to consume the produced data elements. Meanwhile, a second slice of the producer entity is moved to another core and a second slice of a consumer entity is scheduled to consume elements produced by the second slice of the producer.

19 Claims, 7 Drawing Sheets

EFFECTIVE SCHEDULING OF PRODUCER-CONSUMER PROCESSES IN A MULTI-PROCESSOR SYSTEM

RELATED PATENT APPLICATION

This application is related to U.S. Application Ser. No. 12/262,314, entitled "MULTIPLE-PROCESSOR CORE OPTIMIZATION FOR PRODUCER-CONSUMER COMMUNICATION," by Kiran Srinivasan and Prashanth Radhakrishnan, filed herewith.

FIELD OF THE INVENTION

The present invention relates to improving throughput of a computing device, and more particularly, to improving throughput of communication between two isolated entities, such as processes or threads represented in a producer-consumer relationship.

BACKGROUND

Producer-consumer relationship is at the heart of many computing systems. In a producer-consumer (P-C) model, there are different entities or processes (i.e., different producer-consumer pairs) that operate on the same data one after another, in a chain-like fashion, with each entity/process performing a different functionality ("functionality" as used herein refers to how a computer system manages transactions based on various settings or parameters). As a result, data is transferred between the different processes. In such a relationship, a producer thread calls a "producer method" to generate one or more data elements and place the data elements into a region of memory shared between a producer thread and a consumer thread. A consumer thread calls a "consumer method" to read the data elements and "consume" the data elements. A data element may represent a pointer to the area where the processed data items are stored in main memory. The consumer method accesses a pointer and performs multiple address translations in order to access data items in memory shared between the producer and consumer. The following example illustrates how producer-consumer relationship works to process data packets. In a networked storage server, an incoming data packet typically goes through the following processing layers: Ethernet driver→TCP/IP Layer→Network File System (NFS) protocol. In a producer-consumer model, there are at least three different threads of execution for the three functionalities (e.g., Ethernet driver processing, TCP/IP processing, and NFS processing). In order to receive the incoming request, the Ethernet driver acts as a consumer to a network interface card (NIC), which acts as the producer (e.g., it produces data elements, which the Ethernet driver consumes). Next, the Ethernet driver acts as a producer to a TCP/IP stack, which consumes data elements produced by the Ethernet driver. As a request traverses up the network stack, TCP/IP acts as a producer to the higher layer protocols (such as NFS or CIFS), which act as consumers, and so forth. Since the movement of data between the threads of execution is an integral functionality, efficiency of the producer-consumer communication is critical to the performance of a storage system or any other embedded system (i.e., a special purpose computer system designed to perform one or more dedicated functions). In contrast, in a non-producer-consumer model, the functionalities of different entities/processes are all carried out by a single process. Such a process first picks up a data packet from the network using the Ethernet driver functionality, then performs TCP/IP processing, and then performs NFS processing successively without much parallelism in processing.

Multi-core systems are widely used to process data packets. A processor core refers to a complete processing unit (registers, Arithmetic Logic Unit (ALU), Memory Mapping Unit (MMU), cache memories, etc), several of which may be co-located on a single chip (die/socket). The number of cores on a socket is product specific. For example, some of the products by Intel Corporation, of Santa Clara, Calif., have dual-core, quad-core processors etc.

A multi-core system combines two or more independent processor cores into a single package composed of a single integrated circuit (IC), called a die, or more dies packaged together. Typically, CPU cores are equipped with fast on-chip multi-level caches. For example, a CPU core may include two on-chip caches L1 and L2 for both data and instructions. L2 is generally much larger than L1, but has access times much slower than that of L1. In addition to these on-chip caches, the CPU cores might have a third-level larger L3 cache.

A multi-core processor implements multi-processing in a single physical package. In a multi-core environment, each of the producer and consumer processes may run on a different core, thereby providing several advantages. One of the advantages of executing each of the producer and consumer threads on a different core enables parallelism between the consumer and producer threads so that more than one process can be executed at the same time. Furthermore, running producer and consumer processes on different cores may eliminate context switching overhead between the producer and consumer processes, which would be the case if they were to run on the same core. As is known in the art, a process is an instance of a computer program that is being sequentially executed. Context switching is performed when a process is loaded into a processor. Execution context information for each process may include data loaded into CPU registers, memory mapping information associated with the process (such as memory page tables), and/or other information related to a process.

As discussed above, when producer and consumer processes are executed on different cores and communicate over a shared memory mechanism, the producer process writes to some locations in the shared memory region and the consumer process reads from those locations in the shared memory. Typically, a process is executed in a virtual address space created for that process. All processes use the memory mapping information available as part of its execution context to do the translation from virtual to physical addresses. Such a translation is done by the process on memory access using special hardware mechanism called a memory mapping unit (MMU) (not shown in Figures). However, to use the appropriate memory mapping translation tables for a process, the MMU needs to be loaded (programmed) with the appropriate address of the starting location of the memory mapping table. This address is usually part of the process' context maintained by the operating system.

In a shared memory based producer-consumer communication, the producer and consumer processes may not have mapped to the shared memory at the same offset in their respective virtual address spaces. In this case, the virtual addresses need to be translated between the producer and consumer processes. The addresses pointed to by the producer process need to be in a form that is understood by the consumer process. Since the producer process is only executed in a virtual address space and can understand virtual addresses, these virtual addresses cannot be passed directly to the consumer process because the consumer process cannot translate the producer's virtual address to the physical address. According to one communication mechanism, the producer process passes relative addresses of the pointers to the consumer process. According to another communication mechanism for passing addresses, a producer finds appropriate location in the consumer's address space where the memory is mapped and sends addresses relative to the start of the mapped region. The passed pointers are relative to the start of the memory region shared between a consumer process and a producer process. The consumer process is entrusted to convert the relative addresses to the appropriate virtual addresses (based on where the shared memory region is mapped in its virtual address space) before accessing the data.

As noted earlier, before the consumer process can access data in memory, it needs to perform multiple translations of virtual to physical addresses. Such a translation entails multiple memory lookups depending on the processor architecture (e.g., 32 bit or 64-bit) and the size of the address. For example, for 64-bit architectures, multiple levels of page tables are accessed before the final translation can be done. The entries corresponding to each level of page tables need to be accessed and cached. After performing virtual-to-physical address translation, once the consumer thread accesses the data itself, there would be a compulsory miss in level 1 (L1) cache at the core on which the consumer thread is executed, since data elements produced by the producer process are cached at a core where the producer process is executed. At that time, the data item is fetched from further down in the memory hierarchy (e.g., main memory). Multiple translations (commonly referred to as pointer "swizzling") thus require extensive memory accesses as a result of compulsory cache misses. Compulsory cache misses hurt the efficiency of the producer-consumer communication in a multi-core system. This, in turn, impacts overall system performance.

Accordingly, what is a needed is a mechanism that reduces existing inefficiencies of producer-consumer communication mechanism in multi-core systems.

SUMMARY

Embodiments of the present invention provide a novel technique for improving throughput in a multi-core system in which data are processed according to a producer-consumer relationship (i.e., different entities or processes operate on the same data one after another, in a chain-like fashion, with each process performing a different functionality). Performance improvement is achieved by eliminating compulsory cache misses on data accesses performed by a consumer entity. According to embodiments described herein, to maximize the hits in the cache memories at the processing cores, the consumer entity is executed on the same core as the producer entity as soon as the producer entity is done producing data elements. A pair of producer-consumer entities is executed as multiple slices of execution. A slice is defined as a subset or a sequence of routines in an executable program. The execution contexts (e.g., code and data) of the producer and consumer slices are made small enough to fit in the processor caches simultaneously. When a producer entity scheduled to execute on a first core has completed production of data elements that can fit respective cache memories, a consumer entity is scheduled to execute on the same core to consume the produced data elements. Meanwhile, a producer entity is moved to another core and is executed as a second slice to produce more data elements that could not fit into the cache memories on the first core; a second slice of a consumer entity is scheduled to execute on that core to consume elements produced by the producer entity. Since the cache memory at each core is already populated with the data elements produced by the producer process, a consumer entity scheduled to execute at the respective core can access the cached data without incurring cache misses that otherwise would have occurred had the consumer entity been executed on a different core. Thus, additional time (which is typically attributed to cache misses) that is spent to access produced data elements can be reduced, thereby optimizing average latency to process data elements. Since each access of a cache memory (whether successful or not) entails multiple translations of relative-to-virtual and then to physical addresses, by eliminating costly cache misses, this novel mechanism improves throughput of communication between two or more processes in a producer-consumer relationship.

Thus, by cooperatively scheduling a consumer entity on the same processing core as soon as the producer entity has completed production of an appropriate number of data elements, novel embodiments described herein ensure that the consumer entity accesses data elements from the cache memory resided on the same core and thus avoid cache misses.

Other aspects of the invention will become apparent from the following detailed description taken in conjunction with the accompanying drawings, which illustrate the principles of the invention by way of example.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1A:
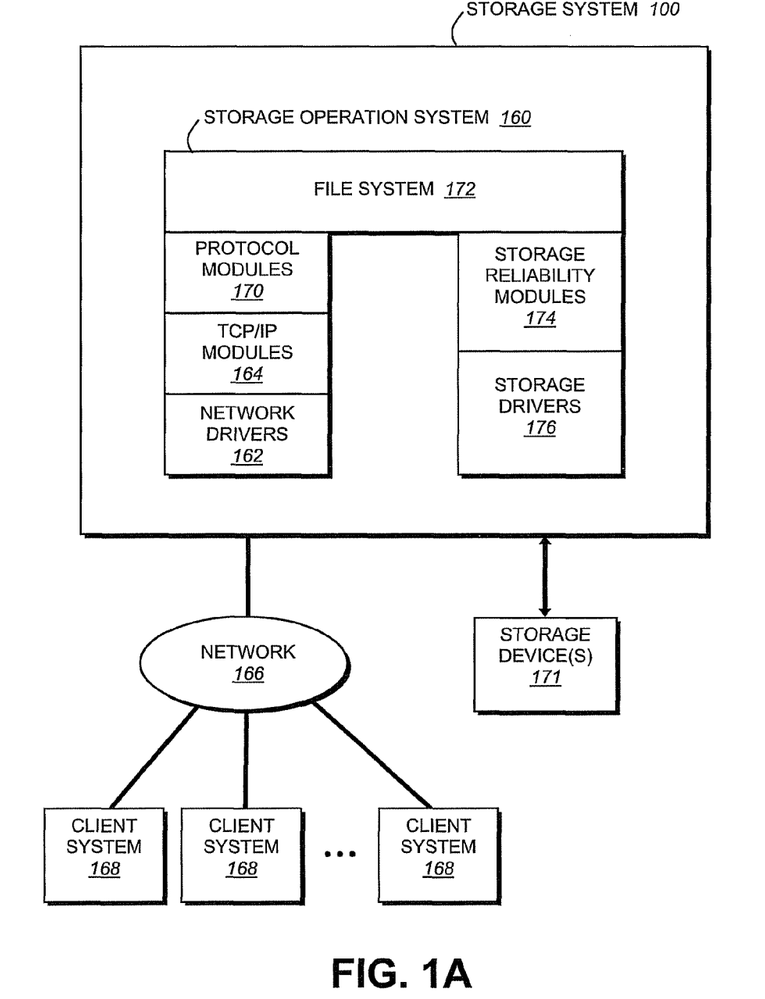
FIG. 1A is a diagram of an exemplary storage system in which novel techniques can be implemented.

FIG. 1A is a diagram of an exemplary storage system in which the present invention can be implemented. To illustrate a consumer-producer relationship, processing of a request sent to a storage system (such as storage system 100) can be considered. Such a storage system 100 services data access requests from the client systems 168. A client system ("client") 168 may be a general-purpose computer configured to execute applications and interact with the storage system 100 in accordance with a client/server model of data delivery. That is, the clients system 168 may request the services of the storage system 100, and the storage system may return the results of the services requested by the client by exchanging data packets over a network (e.g., network 166). A data packet is a unit of data transmitted as a discrete process between devices over a network.

The clients 168 may issue data packets using file-based access protocols and/or block-based access protocols. An exemplary storage system 100 executes a storage operating system 160, which includes components that participate in the producer-consumer relationship. For example, to receive an incoming request, a network driver(s) 162 of storage operating system 160 acts as the consumer for network interface cards (NIC) (not shown in FIG. 1A), which runs a producer process. Network drivers 162 implement one or more lower-level protocols (such as Ethernet, or InfiniBand to communicate over network 166.

Next, as a data packet moves up a network protocol stack (comprising lower level protocols and high level protocols), the lower layer protocol modules (such as TCP/IP module 164) act as producers to the higher layer protocol modules 170, which runs a consumer process. Protocol modules 170 implement various higher level network protocols, such as Network File System (NFS), or Common Internet File System (CIFS), or Hypertext Transfer Protocol (HTTP. As a network protocol stack hands the data packet over to a file system 172, another producer-consumer relationship is created. File system 172 shown in FIG. 1B, in certain embodiments, is software, which imposes a structure (e.g., a hierarchy) on the data stored on storage devices 171 (such as disks). To issue a request to a storage device (such as a request to storage device(s) 171), the storage driver(s) 176 acts as the producer, while the host bus adapter (HBA) (not shown in FIG. 1A) acts as the consumer.

Thus, in a series of producer-consumer relationships, different processes (or entities) operate on the same data one after another in a chain-like fashion, with each entity performing different functionality. Each data element produced by the producer process needs to be consumed by the consumer process. The sum of time taken in production, transmission, and consumption of the data element represents latency of processing a data element. Thus, optimizing the average latency (latency used to process all data elements averaged by the number of data elements) is important. Similarly, optimizing the total throughput of the system (e.g., a number of data elements processed over a period of time) is also important for the multi-core system.

Still continuing with the description of a storage system in which the invention can be implemented, logically under file system 172, storage operating system 160 includes a storage reliability module 174 and storage drivers 176. Storage reliability module 174 implements a higher-level storage redundancy algorithm, such as RAID-3, RAID-4, RAID-5, RAID-6, or RAID-DP. The storage drivers 176 implement a lower-level protocol (such as Fibre Channel or SCSI) to access storage devices 171.

In the illustrative embodiment, storage operating system 160 can be the NetApp® Data ONTAP™ operating system available from NetApp Inc., of Sunnyvale, Calif., which implements a Write Anywhere File Layout (WAFL™) file system, such as file system 172. However, it is expressly contemplated that any appropriate file system may be enhanced for use in accordance with the inventive principles described herein. As used herein, the term "storage operating system" generally refers to the computer-executable code operable on a computer that manages data access. The storage operating system 160 can be implemented as an application program operating over a general-purpose operating system, such as UNIX® or Windows NT®, or as a general-purpose operating system with configurable functionality, which is configured for storage applications as described herein.

Figure 1B:
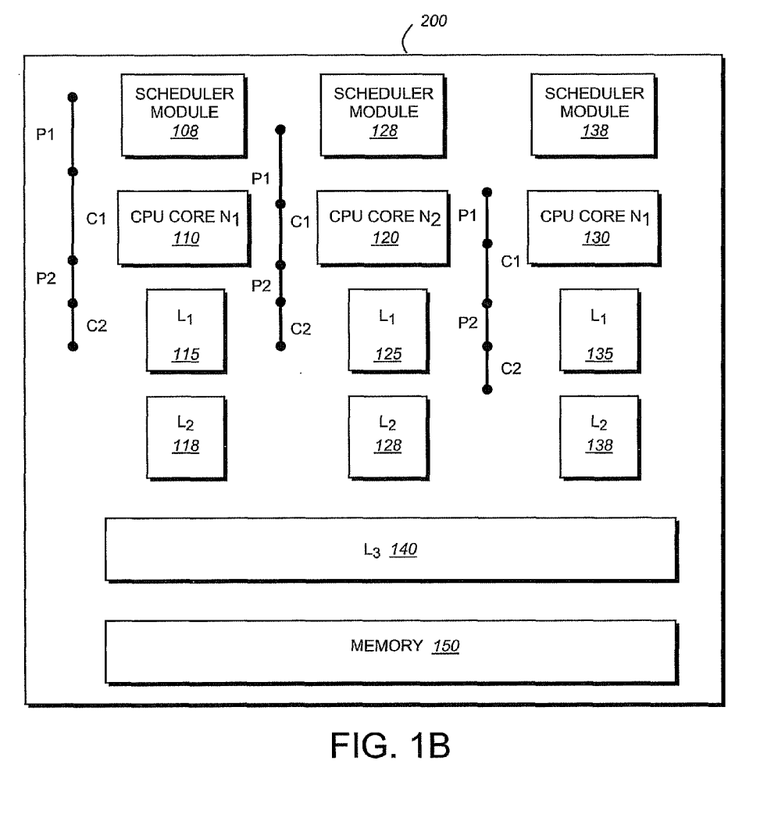
FIG. 1B is a diagram of a multi-core system according to embodiments of the present invention.

FIG. 1B is a schematic block diagram of a multi-core system 200 according to embodiments of the present invention in which producer and consumer entities run as multiple slices of execution. A slice of execution is defined as a subset of a process. For the producer entity, each such slice results in creation (production) of data elements. The consumer slice follows the producer slice and is executed on the same core to consume the produced data elements. Multi-core system 200 may be used as a storage system (such as storage system 100 shown in FIG. 1A). The multi-core system 200 combines two or more central processor unit (CPU) cores (e.g., CPU cores N1, N2, and N3) into a single package composed of a single integrated circuit (IC), called a die, or more dies packaged together. As described herein, a CPU core refers to a complete processing unit (registers, Arithmetic Logic Unit (ALU), Memory Mapping Unit (MMU), cache memories, etc), several of which may be co-located on a single chip (die/socket).

Although three CPU cores are shown in FIG. 1B, those skilled in the art would understand that a multi-core system may combine more than three CPU cores. For example, some of the products provided by Intel Corporation, of Santa Clara, Calif., have quad-core processors. Each CPU core (e.g., cores N1, N2, and N3) is associated with its scheduler module. For example, CPU core N1 is associated with scheduler module 108, which schedules a process (such as a producer process) to be executed by the CPU core N1. CPU core N2 is associated with a scheduler module 128, which schedules a process (such as a second slice of P1) to be executed by the CPU core N2. CPU core N3, in turn, is associated with a scheduler module 138, which schedules a process (such as a third slice of P1) to be executed by the CPU core N3. Once a process has been scheduled to a CPU core by a respective scheduler module (e.g., scheduler modules 108, 128, or 138), the execution context of the process is loaded into a CPU. As described herein, execution context information for each process may include data loaded into the registers, memory mapping information associated with the process (such as memory page tables), and/or other data related to a process.

As part of the loading of a process by a scheduler module to a respective CPU core, the following steps may take place. First, operating system (such as storage operating system 160) creates a virtual address space for a process. Then, if the process is a producer process requiring a shared memory region with a consumer process, a shared memory region is created between a producer process and a consumer process utilizing functionality provided by the operating system.

As noted earlier, multi-core system 200 also implements a multi-tier caching mechanism. Typically, CPU cores are equipped with fast on-chip multi-level caches. Thus, a multi-core system may include on-chip caches L1 and L2 for both data and instructions. L2 is generally much larger than L1, but with access times much slower than L1. In addition to these on-chip caches, the CPU cores might have a third-level, larger L3 cache. Illustratively, in FIG. 1B, CPU cores in a multi-core system 200 may share a single cache memory at the highest on-device cache level (e.g. L3 140) and/or may have separate caches (e.g. L1 and L2). The CPU cores also share main memory 150. The caches are designed to ensure that a significant fraction of the memory accesses made by the CPU are satisfied in the cache with rare accesses to the main memory. The main memory (e.g., 150) represents any form of random access memory (RAM), flash memory, or the like, or a combination of such devices. While in use, the main memory 150 may contain, among other components, at least a portion of the storage operating system 160 of the storage system 100.

Typically, in multi-core systems with multi-tier caching mechanisms, when the producer entity (P) adds a data element for the consumer (C) entity to pick up, the cache lines corresponding to all the data used in the production of the data element reside in the L1 cache of the producer entity. In situations when P and C are run on different cores and communicating over a shared memory mechanism, P writes to some addresses and C reads from those addresses. The locations written to by P would reside in the P's L1 cache. If C were to run on a different core, accessing the data elements produced by the P would result in a compulsory L1 miss, thereby leading to retrieval of the cache lines (corresponding to the data elements) from the P's core or from memory region lower in the memory hierarchy (e.g., memory 150 shown in FIG. 1B). These cache misses are expensive and result in overall performance degradation.

Embodiments of the present invention provide novel mechanisms to ensure that when a consumer entity accesses data elements produced by the producer entity, no compulsory cache misses occur. To this end, the consumer entity is scheduled to execute on the same core as the producer entity after the producer entity has produced the data elements. The consumer entity processes the data elements and would typically serve as the producer entity for the next consumer entity downstream. According to novel embodiments, the producer and consumer entities run as multiple slices of execution. A slice is defined as a subset or a sequence of routines in an executable program. For example, a producer slice produces a few data elements and yields the processor core for future processing by a consumer slice. It is termed as a slice of the producer program because after producing an appropriate number of data elements, a slice voluntarily stops executing although the producer program can continue producing more data elements. For the producer entity, each such slice results in production of data elements; the consumer slice that follows the producer slice will consume these data elements. Each such slice has an associated execution context that comprises of the code and data that a particular slice would access. It is assumed that the execution contexts of the producer and consumer slices are small enough to fit the processor caches simultaneously. As a result, the performance-degrading cache misses are not incurred by the consumer slice. If the producer entity overflows the cache with data before yielding the core to the consumer, the cache lines corresponding to the new data elements might replace the cache lines corresponding to the older data elements. Since the consumer entity that follows the producer entity has to look at the older data elements before the newer ones, accessing the older data elements might create cache misses. To eliminate this problem, the producer entity produces data elements that would fit in the L1/L2 caches before yielding to processing core to the consumer entity. Once the producer entity has yielded the core to the consumer entity, its execution is moved to another core where the producer entity continues to produce data elements. The producer entity is spawned off on different cores until it runs out of cores. Thus, by cooperatively scheduling a consumer entity on the same processing core as soon as the producer has completed production of an appropriate number of data elements, novel embodiments described herein ensure that the consumer entity will access data elements from the cache memory resided on the same core, and thus avoid costly cache misses.

To execute the consumer entity effectively immediately after the producer, the execution context of the producer and consumer pair need to be in the caches (e.g., L1/L2) of the processing core where the consumer entity is scheduled to be executed. The execution contexts of the subsequent producer-consumer pairs can be loaded later (by the time the current consumer entity has finished execution). Knowing the entire P-C chain structure ahead of time makes it possible for a system (e.g., storage system 100) to estimate the time it takes to complete execution of a chain and to put an upper-bound on the number of elements to be produced by the first producer in the chain. Various steps of a method for effective scheduling of producer-consumer processes in a multi-core system will be discussed in greater detail with reference to FIG. 4.

According to an embodiment of the invention shown in FIG. 1B, the first slice of the consumer entity (C1) is executed on the same CPU Core N1 as the first slice of the producer entity (P1) as soon as the producer entity (P1) is done with producing data elements. Further, code and data required by the first slices of execution of the P1 and C1 are fit into the cache of that core (e.g., L1/L2). Thus, data elements produced by P1 will be resident in the caches L1/L2 of CPU core N1 so that C1 can "consume" these data elements without incurring cache misses. This, in turn, increases throughput of the multi-core system. Meanwhile, a scheduler module (e.g., 108, 128, or 138) assigns a new core for the P1 so that a second slice of execution of the P1 is moved to another core (e.g., CPU Core N2). The scheduler module moves execution of C1 to the CPU core N2 where it is executed as a second slice and so forth. Thus, CPU core N2 executes a second slice of the first producer process P1 and a second slice of the first consumer process C1, a second slice of a the second producer process P2 and a second slice of a second consumer process C2. Similarly, once the second slice of P1 finishes execution at CPU core N2, its execution is moved to the CPU core N3, and so forth. As a result, CPU core N3 executes a third slice of P1 and a third slice of consumer process C1, a third slice of producer process P2 and a third slice of consumer process C2 and so forth. As described earlier, a slice of execution is defined as a subset of a process.

As an illustrative example, CPU core N1 may execute the network driver module 162, which acts as the producer entity, to create a request in a form of a data packet. CPU core N1 may also execute consumer process (such as the TCP/IP module 164 or protocols module 170). CPU core N2 may execute another slice of the code of network driver module 162, after execution of the process is moved from CPU core N1 to CPU core N2. Similarly, CPU core N2 may execute another slice of a consumer process (such as the TCP/IP module 164 or protocols module 170) after the execution of the process is moved from the CPU core N1 to CPU core N2.

Figure 2:
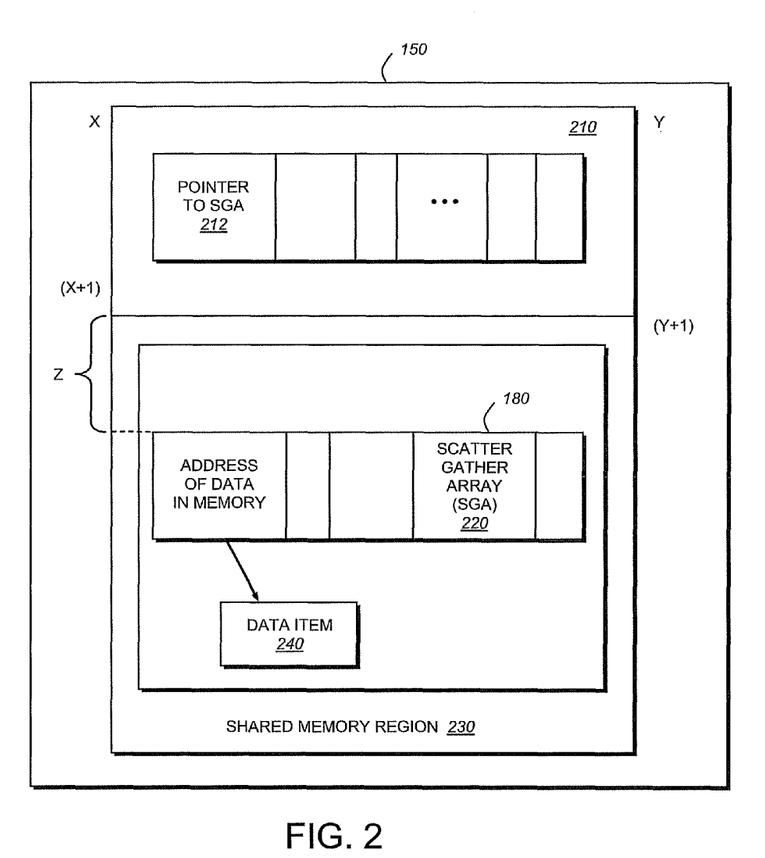
FIG. 2 is a diagram of the shared memory data structures used by a producer-consumer pair of the multi-core system shown in FIG. 1B.

Referring now to FIG. 2, an exemplary shared memory mechanism between a producer process and a consumer process is shown according to embodiments of the present invention. As illustrated in FIG. 2, memory 150 is an embodiment of a shared memory communication data structure among producer-consumer processes in the multi-core system 200. Within the memory 150, a memory region 230 shared between the producer process and one or more consumer processes is created. For each process, the storage operating system creates a virtual address space (not shown in FIG. 2). As is known in the art, the virtual address space of the process may include data, computer instructions, the heap, and the stack (not shown in FIG. 2). In FIG. 2, "X" is the virtual address of the producer process, at which shared memory region 230 is mapped. "Y" is the virtual address of the consumer process at which shared memory region 230 is mapped.

At this point, it is beneficial to describe in more detail how in a conventional system a producer process and a consumer process communicate over a shared memory mechanism. Such a description is useful in distinguishing between conventional systems and a novel mechanism described herein to increase throughput of a producer-consumer pair in a multi-core system.

Still with reference to FIG. 2, for illustrative purposes, a producer process (such as executed by TCP/IP module 164) receives data packets from network drivers 162 (shown in FIG. 1A). The producer process stores the data packet in its associated cache memory (e.g., L1 cache 115 shown in FIG. 1B) and in the main memory 150. The producer process also provides a pointer to the stored data as follows. For every processed data packet, the producer process creates a scatter-gather array (SGA) 220 of elements that contains information about non-contiguous data segments that comprise the data packet. Each element in the SGA typically contains a pointer to signify the starting address of the data in the main memory 150 along with the length of the data. The producer process then provides pointers for each SGA stored in the shared memory region 230. Such pointers (referred to herein as data entries) are stored in a shared data structure (such as data structure 210). Thus, each entry 212 in the data structure 210 points to an address where SGA starts in the shared memory region 230. Data structure 210 can be implemented as a first in, first out (FIFO) queue. If three data packets are received by the producer entity, producer process creates three SGAs (an SGA for each data packet). The shared data structure 210 then stores three entries (each entry represents an address of SGA). Such an address of SGA may include a page number in the shared memory region (e.g., page 1) and provide an offset within the page (e.g., offset Z shown in FIG. 2).

As noted earlier, when a producer process and a consumer process communicate with each other via a shared memory mechanism, the addresses pointed to by the producer process need to be in a form that is understood by the consumer process. As described herein, typically, processes act only on virtual addresses and not on physical addresses. All processes use the memory mapping information available as part of its context to do the translation from virtual-to-physical addresses. Such a translation can be done using special hardware called the memory mapping unit (MMU) (not shown in Figures). However, to use the appropriate memory mapping translation tables for a process, the MMU needs to be loaded (programmed) with the appropriate address of the starting location of the memory mapping table. This address is usually part of the process' context maintained by the operating system.

Figure 3:
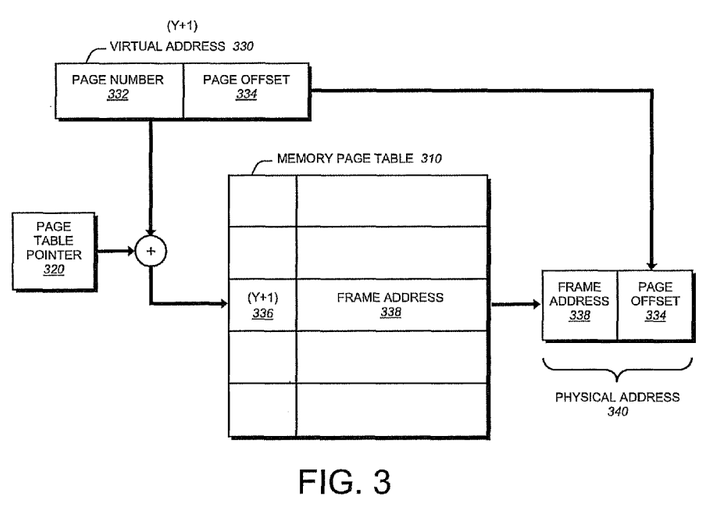
FIG. 3 is a diagram of a memory page table and mechanisms for converting a virtual address to a physical address.

Typically, before the consumer process can access a data packet from main memory (e.g., 150), it needs to perform multiple virtual to physical address translations, as illustrated below. Consumer process accesses an entry(s) in the shared data structure 210 (which stores a relative address of SGA) and converts the relative addresses stored in the entry to a virtual address of SGA in the consumer's virtual address space. Then the consumer process accesses a memory page table associated with it to determine a physical address of an SGA in the main memory (an exemplary memory page table 310 is shown in FIG. 3). It should be noted that each virtual address space is associated with its own memory page table. Each memory page table has an address (shown as page table pointer 320 in FIG. 3), which is stored in main memory 150. Memory page table 310 includes a plurality of entries for storing frame addresses. The entries are indexed by the page number (332) to determine the frame address. The page number (332) can be derived from the virtual address (330). (As an example, the page number could be the 10 most significant bits of the virtual address). For example, if the page number (332) of the virtual address is (Y+1), it is used as an index to access a corresponding entry in the memory page table that stores a frame address (338). The physical address (340) of a data item is a combination of a frame address (338) and a page offset (334) (which was part of the virtual address 330).

Thus, when the consumer process accesses a data item, it first uses a virtual address of SGA to access a memory page entry indexed by the virtual address. As part of accessing the memory page table, the consumer process caches the corresponding entry in its cache memory (e.g., L1). Then the consumer process uses a frame address found in the page table entry to determine a physical address of SGA. To this end, the consumer process combines the frame address with the page offset found in the virtual address. The physical address, in turn, includes a frame address and the original page offset. The consumer process then caches the physical address in its associated cache memory. The translation mechanism described herein is explained for a one level page table. Those skilled in the art would understand that typically there are multiple levels of page tables before the final translation can be done. The entries corresponding to each level of page tables need to be accessed and cached. Multiple memory accesses for the page table entries performed without any help from the caches lead to high latency in accessing data stored in memory.

After performing multiple address translations, consumer process determines a physical address of the SGA and uses that address to access SGA entries (each entry in the SGA stores an address of a data item in main memory 150). To this end, the consumer process reads a relative address stored in SGA entry and translates it to a virtual address. Furthermore, consumer process accesses a memory page table using the virtual address (as discussed above) and caches a corresponding entry in the table. Then, translation of the virtual-to-physical address is performed to determine the physical address of a data item. The physical address is then stored in a memory cache. The consumer process uses the physical address to finally access the data item stored in memory. The consumer process then caches the data item in its cache memory.

Thus, in order to access data items produced by the producer process and stored in the main memory, a consumer process performs multiple memory accesses, which slows down overall system's performance.

According to embodiments of the present invention, the overhead associated with data accesses performed by the consumer process is significantly reduced by ensuring that the cache lines needed for virtual-to-physical address translation (i.e., memory page table entries), as well as the data items themselves, reside in the cache memory on the same core where the consumer process is scheduled to execute. Since the cache memory is already populated, for the consumer's advantage, with the data elements produced by the producer process, cache misses that otherwise would have occurred are reduced; thus no additional time is spent on accessing the produced data elements. As described herein, each access of a cache memory entails multiple translations of relative-to-virtual and then to physical addresses. By eliminating costly cache misses, this novel mechanism improves throughput of communication between two or more processes in a producer-consumer relationship, as illustrated in more detail with reference to FIG. 4.

Figure 4:
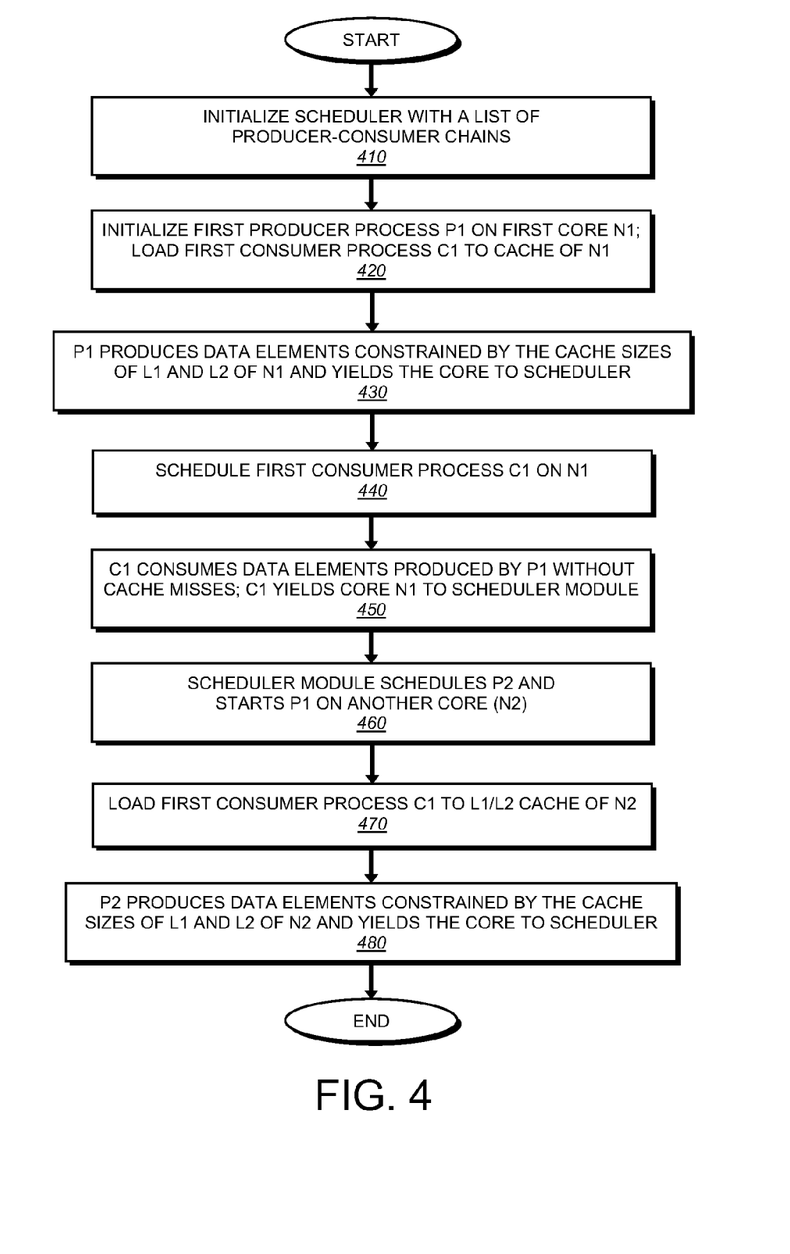
FIG. 4 is a flow diagram of a novel method to improve efficiencies in consumer-producer communications in a multi-core system.

Referring now to FIG. 4, a flow diagram of a novel mechanism for effectively scheduling execution of producer-consumer entities is shown. Initially, a scheduler module (e.g., module 108) executed on N1 core is initialized with producer-consumer entities (step 410). Producer-consumer entities can be provided in a form of a list of pairs or any other suitable form. An exemplary list of producer consumer-consumer pairs is shown below in Table 1.

| List of Producer-Consumer Entities | |
| --- | --- |
| Producer Entity | Consumer Entity |
| Ethernet Drivers | TCP/IP module |
| TCP/IP module | Protocol Modules |
| Protocol Modules | File System |
| File System | Storage Drivers |

At step 420, scheduler module (e.g., module 108) initializes producer process P1 to be executed on CPU core N1. Scheduler module 108 also loads a first consumer process C1 to L1/L2 caches residing on core N1. As part of loading C1 to the caches, execution context that comprises the code and data that C1 would access are put in the caches. Importantly, when P1 is going to finish processing, instructions for C1 will be already in the cache memory on the same core that P1 is executing.

Once P1 producer process is initialized, it starts producing data elements (step 430). According to embodiments described herein, the number of data elements produced by the producer process is dependent on the cache size available to the core. If the producer process produces data elements that can overflow the cache memory before yielding the core to the consumer, then the cache lines corresponding to the new data elements might replace the cache lines corresponding to the older data elements. Therefore, to avoid data overflow in cache memory, according to novel embodiments, the producer entity produces data elements that can fit in the L1/L2 caches before yielding the core to the consumer entity. As described herein, data elements are fit into the caches L1/L2 when the size of the data elements (which include code and data) do not exceed the size of the caches L1/L2. In one implementation, to this end, the storage operating system (e.g., 160 shown in FIG. 1A) provides the size of L1/L2 caches to the producer process (e.g., P1). P1, for example, maintains a running counter (not shown in Figures), which is incremented by the size of the produced data element. Those skilled in the art would appreciate that mechanisms other than a running counter can be used to avoid data overflow. As a reminder, a produced data element may include a pointer to a scatter-gather array (such a pointer can be stored in data structure 210 shown in FIG. 2). The data element may also include a scatter gather array 220 that stores pointers to data items corresponding to a single data packet, and data items themselves. Thus, when a data element is produced, the running counter is incremented by the size of the pointers, the size of scatter-gather arrays, and the size of data items themselves. P1 periodically polls the running counter and compares its size with the size of the caches. If the size maintained by the running counter exceeds the size of the available memory caches, P1 stops producing data elements and yields the core to the scheduler module (e.g., 108).

Once the producer entity (P1) yields the core to the consumer process, scheduler module (e.g., 108) starts execution of C1 on the same core as the P1 process is executed (step 450). As part of the execution, C1 consumes data elements produced by P1. For example, if C1 is a TCP/IP module, it reviews Ethernet frames, checks data for correctness (e.g., by looking at the checksums), and determines whether the frames are contiguous data packets. Importantly, since C1 is scheduled on the same core as P1, C1 can access data in the cache memory that resides on the same core where the consumer process is executed. Such data may include pointers to the scatter-gather arrays, pointers to data items, and data items themselves. When the producer process adds a data element for the consumer to pick up, the cache lines corresponding to all the data used in the production of data elements resides in the L1 cache of the core where the producer entity (P1) was running. Thus, if the consumer process were to run on a different core and tried to access the pointers in the SGA in the cache memory L1 that resides on the CPU core where the consumer process is running, the consumer process would incur a cache miss. Since data elements are in memory caches where P1 is executed, the cache lines corresponding to the data elements would have to be retrieved from the core where the producer process (P1) is running or from a cache/memory region lower in the memory hierarchy, which is undesirable. By scheduling a consumer entity to run on the same core as a producer entity as soon as the producer entity is done producing data elements, novel embodiments described herein ensure that a consumer entity can consume these data elements without incurring unnecessary cache misses.

Still with reference to FIG. 4, once C1 has completed consumption of the produced data elements, C1 yields the core to scheduler module 108 (step 450). Scheduler module consults a list of producer-consumer pairs to schedule the second producer process P2 to be executed on CPU core N1 (step 460).

Meanwhile, scheduler module 108 (or any external scheduler module, which is not shown in the Figures) assigns a new core (e.g., CPU core N2) to the first producer process P1 to execute a second slice of execution to produce more data elements. Scheduler module triggers the same producer-consumer chain to be executed on core N2. Specifically, scheduler module loads execution context for consumer process C1 to L1 125 on CPU core N2 to be executed as a second slice of the consumer process C1 (step 470).

At step 480, P2 produces data elements at CPU Core N1. P2 produces data elements that can fit in the L1/L2 caches before yielding the core to the consumer entity. In one implementation, P2 polls a counter to determine whether the produced data elements fit into L1/L2 caches at CPU Core N1. P2 compares the value of the counter with the size of the caches. If the value exceeds the size of the available memory caches, P2 stops producing data elements and yields the core to the scheduler module (e.g., 108). The scheduler module then schedules P2 to run as a second slice of execution at CPU Core N2. P2 will resume producing more data elements at CPU Core N2 and thereby create an instance of the same P-C chain on that core.

Figure 5:
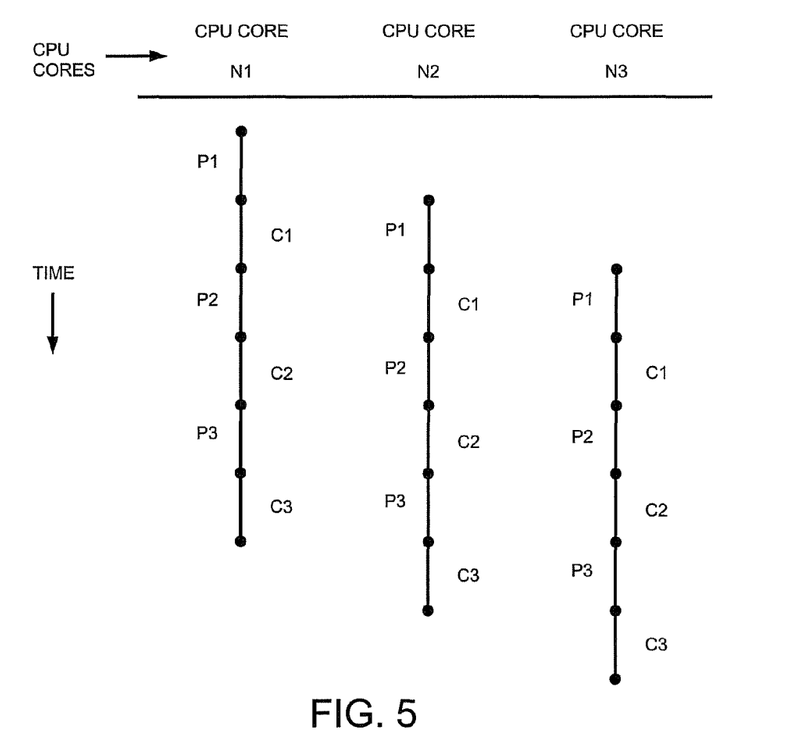
FIG. 5 is a diagram illustrating a novel technique to schedule producer-consumer entities so that the consumer entity is executed on the same processor core as the producer entity.

Referring now to FIG. 5, illustratively three CPU cores N1, N2, and N3 are shown. Those skilled in the art would understand that although only three CPU cores are shown in FIG. 5, storage system (e.g., 100) may include more than three CPU cores. N1 core executes a first slice of producer process (P1) and a first slice of consumer process C1. As described in reference in FIG. 4, when a first slice of a producer process stops producing data elements (due to cache memory constrained on its core) and yields the core to the scheduler module (e.g., 108), a first slice of a consumer process is executed to process data elements produced by the first slice of the P1.

Meanwhile, the second slice of the producer process P1 is scheduled (by e.g., scheduler module 108) to be executed at another CPU core, N2 (shown in FIG. 5). The scheduler module also schedules a second slice of a consumer process (C1) to be executed on core N2. This slice of execution of C2 is intended to process data elements produced by P1. Once the second slice of a producer process P1 stops producing data elements (due to cache memory constrains on its core N2) and yields the core to the scheduler module (e.g., 108), a second slice of a consumer process is executed to process data elements produced by the second slice of the P1.

Meanwhile, the third slice of the producer process P1 is scheduled (by e.g., scheduler module 108) to be executed at another CPU core, N3 (shown in FIG. 5). The scheduler module also schedules a third slice of a consumer process (C1) to be executed on core N3. This slice of execution of C2 is intended to process data elements produced by the third slice of execution of P1. Once the third slice of a producer process P1 stops producing data elements (due to cache memory constrains on its core N3) and yields the core to the scheduler module (e.g., 108), a third slice of a consumer process is executed to process data elements produced by the second slice of the P1. This process is repeated on a first core N1 so that another pair of consumer producer entities (P2-C2) is scheduled to be executed on N1 and then the execution is moved to N2 and N3. As a result, a consumer entity is scheduled to run on the same core as a producer entity as soon as the producer entity is done producing data elements, novel embodiments described herein ensure that a consumer entity can consume these data elements without incurring unnecessary cache misses.

Thus, a novel mechanism described herein significantly improves throughput of the multi-core system running multiple producer-consumer processes by running producer and consumer entities as multiple slices of execution and scheduling a consumer entity on the same CPU core as soon as the producer has completed production of an appropriate number of data elements. Such cooperative scheduling reduces undesirable cache misses and reduced additional time typically spent by a consumer entity to access produced data elements. This, in turn, reduces the average latency to process data elements.

Figure 6:
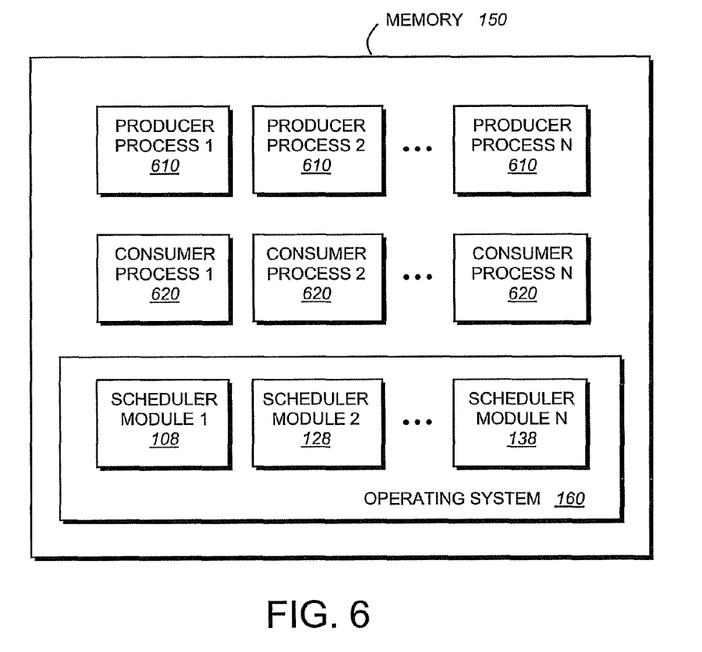
FIG. 6 is a diagram showing various components stored in main memory shown in FIG. 1B.

Referring now to FIG. 6, it illustrates various processes (described above) stored in memory 150 shown in FIG. 1B. Typically, processes go through various process states, which determine how the process is handled by the operating system. When a process is created, its executable is loaded into main memory (e.g., memory 150). Once the process has been scheduled to a CPU (such as CPU core N1 110, CPU core N2 120, or CPU core N3 130 shown in FIG. 1B) by the operating system scheduler, the execution context of the process is loaded (e.g., populating the processor core registers with process information). Then, the CPU core actually starts executing the process' instructions. As shown in FIG. 6, memory 150 stores various processes (such as a producer process 1 through N (collectively labeled as 610) and one or more consumer processes (1 through N and collectively labeled as 620)). Memory 150 also stores operating system 160, which in turn includes one or more scheduler modules (e.g., 108, 128, and 138), different instances of which runs on different cores. A scheduler instance chooses processes for execution on its CPU core.

Although the present invention, for the purpose of explanation, has been described with reference to specific exemplary embodiments, it will be understood that the invention is not limited to the embodiments described. A person of ordinary skill in the art would understand that the present invention can be practiced with modifications and alternations to those embodiments or can be practiced in other embodiments within the spirit and scope of the appended claims.

Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or system.

The present invention can be implemented by apparatuses for performing the operations herein. These apparatuses may be specially constructed for the required purposes or they may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g., electronic) constructions and each coupled to a computer system bus. Each of these media may be coupled to a computer system bus through use of an appropriate device for reading and or for writing the media.

What is claimed is:

1. A method for data processing in a producer-consumer environment on a multi-core processor system, comprising:
    executing a producer-consumer pair of processes at the multi-core processor system;
    executing a producer process of the producer-consumer pair on a first processing core of the multi-core processor system to produce data elements, wherein a first portion of the data elements is cached in a first cache of the first processing core that references data in a memory shared by the producer-consumer pair;
    in response to producing the first portion of the data elements cached in the first cache by the producer process of the producer-consumer pair, scheduling a consumer process of the producer-consumer pair to execute on the first processing core and executing the consumer process on the first processing core to consume the first portion of the data elements cached at the first processing core;
    moving the producer process to execute on a second processing core of the multi-core system to produce a second portion of the data elements, wherein the second portion of the data elements are cached in a second cache of the second processing core; and
    in response to producing the second portion of the data elements cached in the second cache, scheduling the consumer process to execute on the second processing core and executing the consumer process on the second processing core to consume the second portion of the data elements cached at the second processing core.

2. The method of claim 1, further comprising yielding the first processing core to a scheduler module to schedule a second producer-consumer pair of processes for execution on the first processing core.

3. The method of claim 1, further comprising loading first execution contexts of the producer process and the consumer process to the first cache of the first processing core.

4. The method of claim 3, further comprising loading second execution contexts of a second producer-consumer pair of processes to the first cache of the first processing core when the consumer process finishes processing the data elements produced by the producer process.

5. The method of claim 2, further comprising maintaining an order of the producer-consumer pair of processes and the second producer-consumer pair of processes and scheduling both producer-consumer pairs of processes for execution according to the order.

6. The method of claim 1, further comprising executing the producer-consumer pair of processes as multiple slices of execution.

7. The method of claim 6, further comprising executing by the first processing core a first slice of execution of the producer-consumer pair and a first slice of execution of a second producer-consumer pair, and executing by the second processing core a second slice of execution of the producer-consumer pair and a second slice of execution of the second producer-consumer pair.

8. The method of claim 1, further comprising:
accessing, from the first cache at the first processing core where the producer process is executed, a relative address of the memory shared between the producer-consumer pair of processes, to access a scatter-gather array that stores a plurality of relative addresses of address data stored in the shared memory;
translating the relative address to a virtual address of the address data;
translating the virtual address to a physical address of the address data; and
accessing the address data in the shared memory using the physical address.

9. The method of claim 1, further comprising:
determining whether the data elements produced by the producer process can fit in the first cache, wherein determining comprises,
 maintaining a running counter at the first processing core;
 increasing the running counter by a size of a produced data element of the data elements produced by the producer process; and
 if the size of the produced data element residing in the first cache is equal to a size of the first cache, stopping execution of the producer process at the first processing core.

10. The method of claim 9, wherein the size of the produced data element comprises a size of a pointer to a scatter-gather array that stores pointers to data corresponding to the produced data element.

11. The method of claim 1, wherein producing the data elements comprises:
receiving a data item;
processing the data item;
storing the data item in the shared memory;
storing in the shared memory a data element of the data elements, wherein the data element references the data item; and
storing the data element in the first cache at the first processing core where the producer process is executed.

12. A non-transitory computer-readable medium containing executable program instructions executed by a processor, comprising:
program instructions that execute a producer-consumer pair of processes at a multi-core processor system;
program instructions that execute a producer process of the producer-consumer pair on a first processing core of the multi-core processor system to produce data elements, wherein a first portion of the data elements is cached in a first cache of the first processing core that references data in a memory shared by the producer-consumer pair;
program instructions that, in response to producing the first portion of the data elements cached in the first cache by the producer process, schedule a consumer process of the producer-consumer pair to execute on the first processing core and execute the consumer process on the first processing core to consume the first portion of the data elements cached at the first processing core;
program instructions that move the producer process to execute on a second processing core of the multi-core system to produce a second portion of the data elements, wherein the second portion of the data elements are cached in a second cache of the second processing core; and
program instructions that, in response to producing the second portion of the data elements cached in the second cache, schedule the consumer process to execute on the second processing core and execute the consumer process on the second processing core to consume the second portion of the data elements cached at the second processing core.

13. A system for data processing in a producer-consumer environment on a multi-core processor system, comprising:
means for executing a producer-consumer pair of processes at the multi-core processor system; and
means for executing a producer process of the producer-consumer pair on a first processing core of the multi-core processor system to produce data elements, wherein a first portion of the data elements is cached in a first cache of the first processing core that references data in a memory shared by the producer-consumer pair;
means for, in response to producing the first portion of the data elements cached in the first cache by the producer process of the producer-consumer pair, scheduling a consumer process of the producer-consumer pair to execute on the first processing core and to execute the consumer process on the first processing core to consume the first portion of the data elements cached at the first processing core;
means for moving the producer process to execute on a second processing core of the multi-core system to produce a second portion of the data elements, wherein the second portion of the data elements are cached in a second cache of the second processing core; and
means for scheduling the consumer process to execute on the second processing core and means for executing the consumer process on the second processing core to consume the second portion of the data elements cached at the second processing core in response to producing the second portion of the data elements cached in the second cache.

14. The system of claim 13, further comprising means for pre-loading an execution context of the consumer process in the first processing core on which the producer process is executed.

15. The system of claim 14, wherein the means for pre-loading the execution context comprises means for loading memory mapping information associated with the producer process.

16. A multi-core system having a plurality of processing cores for data processing in producer-consumer environments, comprising:
a first processing core, of the plurality of processing cores, configured to execute a producer process and a consumer process of a producer-consumer pair, the producer process configured to produce data elements; and
a scheduler module configured to:
 in response to producing the first portion of the data elements cached in the first cache by the producer process, schedule a consumer process of the producer-consumer pair to execute on the first processing core, of the plurality of processing cores, to consume the first portion of the data elements cached at the first processing core, move execution of the producer process to a second processing core to produce a second portion of the data elements, and schedule the consumer process to execute on the second processing core, in response to producing the second portion of the data elements.

17. The system of claim 16, further comprises:

a first cache of the first processing core to store a first portion of the data elements, wherein the first cache references data in a memory shared by the producer-consumer pair and accessed by the consumer process;

a data structure comprising a plurality of entries, each entry configured to store a relative address of a scatter-gather array in a shared memory region of the shared memory; and wherein the scatter-gather array comprises a plurality of entries and corresponds to the data processed by the producer process, the data comprising a plurality of data items, each entry in the array configured to store a relative address of a data item of the plurality of data items in the shared memory.

18. The system of claim 16, wherein the first processing core is further configured to execute a first slice of execution of the producer-consumer pair and a first slice of execution of a second producer-consumer pair, and wherein the second processing core is further configured to execute a second slice of execution of the producer-consumer pair and a second slice of execution of a second producer-consumer pair.

19. The system of claim 17, further comprising a running counter of the first processing core, wherein the running counter is increased by a size of a produced data element, wherein the first processing core is further configured to stop execution of the producer process if the size of the produced data element residing in the first cache is equal to a size of the first cache.

* * * * *